(No Model.)
G. W. NIEDRINGHAUS.
ATTACHING HANDLES AND COVERS TO VESSELS.
No. 519,069. Patented May 1, 1894.
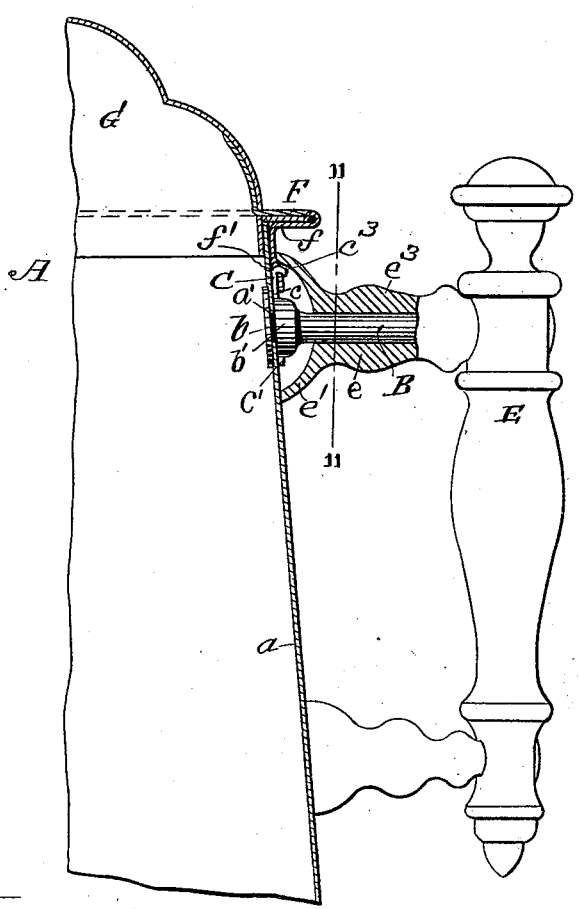
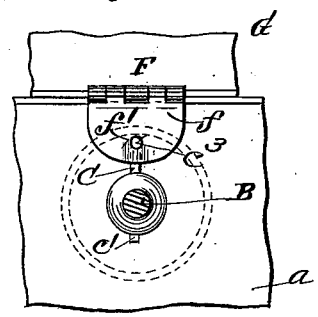
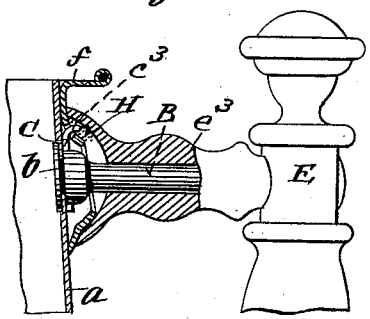
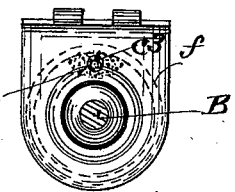

UNITED STATES PATENT OFFICE.

GEORGE W. NIEDRINGHAUS, OF ST. LOUIS, MISSOURI, ASSIGNOR TO THE ST. LOUIS STAMPING COMPANY, OF SAME PLACE.

ATTACHING HANDLES AND COVERS TO VESSELS.

SPECIFICATION forming part of Letters Patent No. 519,069, dated May 1, 1894.

Application filed September 19, 1893. Serial No. 485,881. (No model.)

*To all whom it may concern:*

Be it known that I, GEORGE W. NIEDRINGHAUS, of St. Louis, Missouri, have made a new and useful Improvement in Attaching Handles and Covers to Vessels, of which the following is a full, clear, and exact description.

One object of my invention is to provide an improved means for attaching handles to vessels, and more particularly to sheet-metal vessels, in which a rivet is inserted in the body of the vessel to project outward therefrom to connect the handle.

An additional object is to provide for attaching a cover to the vessel, and the improvement is more fully carried out when both a handle and a cover are applied to the vessel.

The improvement consists more especially in the means whereby the rivet is rigidly secured in position in the vessel body, and the leaf of the cover hinge is attached, all substantially as is hereinafter set forth and claimed, aided by the annexed drawings, making part of this specification, in which—

Figure 1 is a sectional elevation showing a portion of a vessel and a handle applied thereto according to the principle of the improvement; Fig. 2 a section on the line 11—11 of Fig. 1, the handle being removed; Fig. 3 a view analogous to that of Fig. 1, but showing the cover hinge leaf extended downward: and Fig. 4 a detail being a section analogous to that of Fig. 2, but showing the hinge-leaf of Fig. 3, and omitting the portion of the shell of the vessel and the cover shown in Fig. 2.

The same letters of reference denote the same parts.

A represents the body of the vessel—which may be of any desirable shape, size, or style consistent with the nature of the improvement.

As the improvement relates to that portion of the vessel which is in the immediate vicinity of the handle and cover hinge, the vessel need not be, and is not shown in full.

B represents the rivet employed in attaching the handle. It is of suitable material, such as soft iron, and it extends from the inner side of the shell, *a*, of the vessel outward therefrom and to any desired length to connect the handle. The shell is suitably perforated at *a'*, to provide for the rivet being arranged as described. The head *b* of the rivet comes against the inner side of the shell. The rivet, saving its head, may be of uniform diameter or cross section throughout its length, or it may have an enlarged portion, next or in the vicinity of its head. The rivet should fit as snugly as is practicable in the aperture *a'*. But what I rely upon, in part at least, for securing the rivet in the shell *a* is a pin, C, which is passed transversely through the rivet (which is suitably perforated to receive it) upon the outer side of the shell *a*, and having its ends, *c*, *c'*, projecting to lap upon the adjacent portion of the shell *a*. The pin is arranged to come as closely as is practicable against the outer side of the shell, and so that when in position it shall operate to draw the head of the rivet more or less against the inner side of the shell.

The operation of securing the rivet in place is more fully carried out by upsetting a portion of the rivet against the pin-ends, and, if desired, against the shell, and so that when the upsetting operation is completed the upset-portion of the rivet assumes the shape indicated. If the rivet has an enlarged portion, *b'*, the pin is passed through such enlarged portion, and then the rivet is upset. In the last mentioned case the portion of the rivet that is upset may be taken exclusively from the enlargement *b'*. It may be desirable to use a washer, in which case the washer may be arranged between the pin and the outer side of the shell and the pin and washer may be upset against the shell. It should be borne in mind that in practice the portions of the rivet, or of the washer, or of both the rivet and the washer, that are upset are comparatively small, and to render readily discernible they are enlarged in the present illustration of the improvement.

The application of the handle is illustrated in Figs. 1 and 3. The handle is of a style adapted to a dipper or any cup-shaped vessel. The rivet may be a plain one, or it may be in the form of a screw. In either case the handle is either perforated and is slipped onto the rivet, or is screwed onto the rivet, and to strengthen and complete the construction the handle usually has a tubular metal tip, e, which is applied to the inner end of the handle, and having a bell-shaped or cup-shaped extension e' which incloses the described pin and the adjoining portion of the rivet, and abuts against the outer side of the shell of the vessel, substantially as shown, and when a plain rivet is used, a cross-pin, is usually passed transversely through the metal tip, the handle, and the rivet.

In Figs. 1, 2 and 3 is shown the additional feature of the improvement, namely, the mode of attaching the vessel-cover hinge F. The cover, G, of the vessel may be of any suitable style, and its hinge F is also of the ordinary construction saving that its leaf $f$ is shaped to extend downward between the arm $e^3$ of the handle E, and the shell of the vessel, and is perforated at $f'$ to enable the leaf to be hooked onto the pin C which, to coact with the hinge-leaf, is extended upward and is turned outward to form a point $c^3$, substantially as shown. The hinge-leaf does not connect with or bear upon the rivet necessarily, but is held in place by attaching it to the pin, and by being bound between the inner end of the handle and the shell of the vessel, substantially as shown. That is, while the vessel-handle may be variously shaped, it has, in order to carry out the feature of the improvement under consideration, an arm $e^3$ whose inner end portion is cup-shaped as shown to inclose not only the rivet but also the pin and the coacting portion of the hinge-leaf, and in securing the handle to the vessel it is suitably drawn onto the rivet and against the shell of the vessel to cause the handle-arm to suitably bind the hinge-leaf.

In Figs. 3 and 4, additional features are exhibited: A head is formed upon the portion of the pin that projects through the hinge-leaf, say by applying solder H thereto, and the hinge-leaf is not only extended downward to connect with the pin, but it may be provided with a circular, or approximately circular, or an equivalent, flange which enters the cup of the handle-arm and, by bearing upon the inner side of the peripheral portion thereof, substantially as shown, caused to be interlocked therewith. This last named feature however being shown in another application for Letters Patent is not herewith claimed.

I do not in the present application lay claim to any subject matter shown and claimed in a pending application of mine for Letters Patent for an improvement in attaching handles and covers to vessels, filed September 19, 1893, and numbered serially 485,882.

I claim—

1. The combination of the vessel-shell, the rivet, the extended pin, and the hinge-leaf, said pin passing through said rivet and connecting with said leaf, substantially as described.

2. The combination of the vessel-shell, the rivet, the pin, said rivet having a head bearing against the inner side of said shell, and being perforated to receive said pin, said pin bearing against the outer side of said shell, and being extended and engaging with said hinge-leaf, substantially as described.

3. The combination of the vessel-shell, the rivet, the pin, the hinge-leaf, and the handle, said rivet having a head that bears against the inner side of said shell, and being perforated to receive said pin, said pin passing through said rivet and bearing against the outer side of said shell, and being extended and engaging with said leaf, as described and said handle being secured to said rivet, and having its inner end bearing against said leaf, substantially as described.

Witness my hand this 13th day of September, 1893.

GEORGE W. NIEDRINGHAUS.

Witnesses:
C. D. MOODY,
A. BONVILLE.